US007475255B1

(12) United States Patent
Guthery

(10) Patent No.: US 7,475,255 B1
(45) Date of Patent: Jan. 6, 2009

(54) ANALOG PHYSICAL SIGNATURE DEVICES AND METHODS AND SYSTEMS FOR USING SUCH DEVICES TO SECURE THE USE OF COMPUTER RESOURCES

(76) Inventor: Scott B. Guthery, 80 Manemet Rd., Newton, MA (US) 02459

( * ) Notice: Subject to any disclaimer, the term of this patent is extended or adjusted under 35 U.S.C. 154(b) by 1168 days.

(21) Appl. No.: 10/700,369

(22) Filed: Nov. 3, 2003

(51) Int. Cl.
*H04L 9/00* (2006.01)
(52) U.S. Cl. .................. 713/187; 713/168; 713/180
(58) Field of Classification Search ................. 713/176, 713/168, 180, 187
See application file for complete search history.

(56) References Cited

U.S. PATENT DOCUMENTS

| | | | |
|---|---|---|---|
| 4,412,208 A | 10/1983 | Akazawa et al. | |
| 4,599,489 A | 7/1986 | Cargile | |
| 4,924,175 A * | 5/1990 | Clinton | 324/73.1 |
| 5,123,045 A | 6/1992 | Ostrovsky et al. | |
| 5,570,091 A | 10/1996 | Noro et al. | |
| 5,596,280 A * | 1/1997 | Riggio, Jr. | 324/606 |
| 6,327,378 B1 * | 12/2001 | Ball | 382/137 |
| 6,327,652 B1 | 12/2001 | England et al. | |
| 6,584,214 B1 | 6/2003 | Pappu et al. | |
| 2002/0154893 A1 * | 10/2002 | Tanaka et al. | 386/95 |
| 2005/0203841 A1 * | 9/2005 | Hoffman et al. | 705/39 |

OTHER PUBLICATIONS

Ravikanth Pappu et al., "Physical One-Way Functions", Science Magazine, vol. No. 297, pp. 2026-2030, Sep. 20, 2002.

Blaise Gassend et al., "Controlled Physical Random Functions" Massachusetts Institute of Technology, Laboratory for Computer Science, Cambridge, MA, Dec. 2002.
Fox, Barry, "'Subversive' code could kill off software piracy" http://www.newscientist.com/news/news.jsp?id=ns99994248; Original publication date Oct. 10, 2003; Printed date Apr. 26, 2004.

* cited by examiner

*Primary Examiner*—Gilberto Barron, Jr.
*Assistant Examiner*—Samson B Lemma
(74) *Attorney, Agent, or Firm*—Evans & Molinelli PLLC

(57) ABSTRACT

A method for binding a computer program to an analog physical signature device to form an interactive system for controlling the use of the computer program, the method comprising the steps of providing instructions comprising the computer program, the instructions implementing an intended functionality, providing the analog physical signature device to which the computer program is to be bound, the analog physical signature device being operative, in response to an analog input, to transform the analog input into a consequent, dependent analog output, and replacing at least one code segment of the instructions representing a program expression, with an alternative code segment, the alternative code segment defining a predetermined digital input that is causally related to a predetermined analog input by means of the interactive system, the alternative code segment being operative, when encountered during execution of the instructions comprising the computer program, to cause the predetermined analog input to be communicated to the bound analog physical signature device by means of the interactive system, the bound analog physical signature device being operative to transform the predetermined analog input to a consequent, dependent analog output that is causally related to a consequent, dependent digital output by means of the interactive system, the alternative code segment being operative to perform program functionality dependent upon the predetermined digital input and the consequent, dependent digital output.

71 Claims, 11 Drawing Sheets

ANALOG PHYSICAL SIGNATURE DEVICES AND METHODS AND SYSTEMS FOR USING SUCH DEVICES TO SECURE THE USE OF COMPUTER RESOURCES

STATEMENT OF GOVERNMENTAL INTEREST

This invention was made with Government support under Contract No. FA8650-04-C-8002 awarded by the Department of the Air Force Small Business Innovative Research (SBIR) program. The Government has certain rights in the invention.

FIELD OF THE INVENTION

This application is directed generally to computer resource security, and more specifically, to the binding of analog physical signature devices to computer resources for the purpose of identifying and controlling the use of such bound computer resources.

BACKGROUND OF THE INVENTION

The security of computer resources has many diverse aspects. The facet of security of concern herein is controlling the use of computer resources. By computer resources we shall mean throughout both computer hardware operated by means of program instructions (e.g., central processing unit, storage disc and peripheral device) and computer software that comprises said program instructions (e.g., executable computer program, linkable object library and programming language source code). A method and system to control the use of a computer resource provides the means to describe, implement and enforce policies regarding where, when, why, how, and by whom the computer resource may be used.

Controlling the use of computer resources provides benefits to both the entity providing the computer resources and the entity using the computer resources. The entity providing the computer resources can, for example, rely on methods and systems for controlling use of the computer resources to insure that the computer resources are used in the proper place, at the proper time, in the proper way and by the proper user. On the other hand, the entity using computer resources can, for example, rely on methods and systems for controlling use computer resources to insure that the computer resources are fit-for-purpose, are in working condition, are the latest versions and are genuine and unaltered.

A necessary component of methods and systems for controlling the use of computer resources is the reliable and unambiguous identification of individual computer resources. For example, to implement the policy that a particular program must only be used on a particular computer, it is necessary to be able uniquely identify both the individual program and the individual computer.

An individual computer resource can be provided with a unique identification by binding it to a uniquely identified physical object. The metallic serial number tag on the back of a computer chassis is an example of identifying an individual computer resource by binding it to a uniquely identified physical object. The product identification sticker on the jewel case or shrink-wrap containing an individual computer program is another example of identifying an individual computer resource by binding it to a uniquely identified physical object.

In order to be reliable and unambiguous, the identification of individual computer resources must be provided in a way that cannot be subverted, modified, sabotaged, tampered, altered, cloned, copied, or in any other way, means or manner undermined by parties seeking to violate the control of the computer resource. Examples of acts to be rendered as practically impossible include, but are by no means limited to, removing the identification of an individual computer resource ("anonymizing"), changing the identification of an individual computer resource to the identity of a second computer resource ("spoofing"), and creating a second computer resource with the same identification as an existing computer resource ("cloning").

Both of the examples of computer resource identification through binding to a uniquely identified physical object above, the serial number tag and the product identification sticker, are subject to all three of these attacks. Both the serial number tag and the product identification sticker can be removed ("anonymizing"), attached to alternative computer resources ("spoofing"), and duplicated ("cloning").

These attacks and others mounted on the identification of an individual computer resource through binding to a uniquely identified physical object are mounted on the uniquely identified physical object as well as the binding of the uniquely identified physical object to the individual computer resource. Therefore, both the nature of the uniquely identified physical object and the nature of its binding to the individual computer resource must be considered when assessing the suitability and security of means for providing an individual computer resource with a unique identification through binding to an uniquely identified physical object.

There are in the current art methods and systems for the identification of an individual computer resource through binding to a uniquely identified physical object. In order to counter attacks on the binding of the computer resource to the uniquely identified physical object in this case, means are provided such that the individual computer resource operates correctly if and only if the binding to the uniquely identified physical object is intact. A physical device employed as the uniquely identified physical object in the identification of an individual computer resource is designated as a physical signature device because the successful use of the individual computer resource implies the presence of the physical signature device and thus the physical signature device can be said to sign for and consequently authorize the use of the individual computer resource.

A familiar and widely used example of binding a software computer resource to a physical signature device is described and claimed in U.S. Pat. No. 4,599,489 (Solid state key for controlling access to computer software). Such a device is often referred to as a "dongle". An executable program software computer resource that is bound to an individual dongle will operate correctly if and only if it is currently connected to that individual dongle. In other words, the dongle is a physical signature device.

Physical signature devices are of two kinds: digital and analog. The dongle is an example of a digital physical signature device. It stores a particular identification number in digital circuitry and provides this identification number in digital form to the executable program on demand, typically through the serial, parallel or USB port on the computer on which the executable program is being used. When the executable program is placed into execution, the executable program checks for the presence of an individual dongle on the communication port and only continues to execute if the individual dongle is found to be present on the communication port.

As another example of a digital physical signature device is the trusted computing platform. An example of this technique is described and claimed in U.S. Pat. No. 6,327,652 (Loading and identifying a digital rights management operating system). When an executable program is placed into execution on an individual trusted computing platform, the executable program performs a cryptographic protocol to verify the authenticity of the credentials of the individual trusted computing platform. If the credentials of authenticity not present or are not in order then the executable program does not continue execution.

A shortcoming of methods and systems based on digital physical signature devices such as the dongle and the trusted computing platform is that explicit instruction sequences must be included in and executed by the executable program to interact with the digital physical signature device. These instruction sequences in the executable program, however, can be excised from or bypassed without affecting the functionality of the computer resource. In this way, a version of the computer resource is created that can used successfully without requiring the presence of the digital physical signature device ("anonymizing").

Another shortcoming of methods and systems that use digital physical signature devices such as the dongle and the trusted computing platform is that additional means must be provided to make it difficult to fabricate duplicate copies of the digital physical signature devices ("cloning") and to ensure that the unique identification provided by the digital physical signature device cannot be altered ("spoofing"). Providing these means adds expense to the production of both the computer resource and the uniquely identified physical object used for its identification and control of its use.

Another shortcoming of methods and systems that use digital physical signature devices such as the dongle and the trusted computing platform is that few precautions are taken to prevent intrusive physical investigation and analysis ("tamper-resistance") and intrusive physical investigations and analyses may be performed without leaving any indications that an intrusion has been made or attempted ("tamper-evidence").

Another method and system available in the current art to control the use of a computer resource using a digital physical signature device is based on encryption of the instructions for operating the computer resource and execution of the encrypted instructions inside a special-purpose processor that is operative to decrypt the instructions as they are used to operate the computer resource. An example of this technique for an executable program software computer resource is described and claimed in U.S. Pat. No. 5,123,045 (Comprehensive software protection system). The executable program and the data to which it is being applied are stored in an encrypted form in an uncontrolled computer memory. The uncontrolled computer memory is connected to a controlled central processing unit that is contained in a sealed, tamper-resistant enclosure. The controlled central processing unit retrieves the encrypted instructions and data from the uncontrolled computer memory, decrypts the instructions and data once they are inside the controlled central processing unit, encrypts the results of applying the decrypted instructions to the decrypted data, and places the encrypted results back in the uncontrolled memory.

One shortcoming of this method and system is that it requires a special-purpose computer in a secure enclosure, which adds expense to the production of both the computer resource and the uniquely identified physical object used for its identification. Another shortcoming of this method and system is that the computer resource operates more slowly than it is capable of operating due to the necessity to continuously decrypt the instructions and the data with and on which it operates and to continuously encrypt the results of applying the decrypted instructions to the decrypted data. Another shortcoming of this method and system is that is not readily applied to computer resources other than executable program software computer resources.

A need exists, therefore, to provide a low-cost physical signature device and a method and system for binding said low-cost physical signature device to computer resources for the purpose of controlling the use of computer resources that does not exhibit the above-mentioned shortcomings of the current art. Such a physical signature device should provide a unique indicium ("signature"). Such as physical signature device should be difficult to alter or duplicate. Such a physical signature device should be easily and yet tightly, securely and irrevocably bound to a computer resource. Such a physical signature device should be tamper-resistant and tamper-evident. Such a physical signature device should be able to be used with many different kinds of hardware and software computer resources. The security provided by such a physical signature device should not be based exclusively on instructions for the purpose of interacting with the device. Nor should such a physical signature device require the encryption/decryption of the operating instructions for the computer resource or the use of a special purpose central processing unit.

BRIEF SUMMARY OF THE INVENTION

An object of the present invention is providing a low-cost analog physical signature device that provides a unique signature, is difficult to duplicate, and is tamper-resistant and tamper-evident. An additional object of the present invention is providing a low-cost analog physical signature device and a method and system for binding such an analog physical signature device to computer resources for the purpose of controlling the use of such computer resources. An additional object of the present invention is providing a low-cost analog physical signature device and a method and system for binding such an analog physical signature device to computer resources for the purpose of protecting against reverse engineering.

These and other objects of the present invention are provided by the relatively complex, immutable, inhomogeneous and unique properties of an individual physical object that is bound to an individual computer resource for the purpose of identifying and controlling the use of such individual computer resource. A physical object that has these properties and is used for these purposes is referred to hereafter as an analog physical signature device.

The aforementioned properties of an analog physical signature device provide unique indicium (consequent, dependent analog outputs that provide unique signatures) while at the same time making it difficult to duplicate or alter the analog physical signature device without altering or destroying such unique indicium. The aforementioned properties of an analog physical signature device also provide resistance to and evidence of attempts to intrusively examine, analyze or alter the analog physical signature device.

Also in accordance with the present invention, the aforementioned properties of an analog physical signature device are embedded in and tightly bound to the functionality of the computer resource in such a manner that altering, tampering with or removing the bound analog physical signature device or its binding to the computer resource impacts the functionality of the computer resource to a degree that the computer resource is no longer of any use or value for its intended purpose.

Also in accordance with the present invention, the properties of embedding and tightly binding the analog physical signature device to the computer resource provide protection against reverse engineering of the computer resource.

BRIEF DESCRIPTION OF THE DRAWINGS

A more complete understanding of the present invention and the attendant features and advantages thereof can be had by reference to the following detailed description when considered in conjunction with the accompanying drawings wherein.

DETAILED DESCRIPTION OF THE INVENTION

Analog Physical Signature Device

An analog physical signature device by its intrinsic nature provides a wider range of signatures, is less expensive to construct, and is more difficult to attack than a digital physical signature device. An analog physical signature device is inherently difficult to duplicate, clone or spoof because of its relatively complex and inhomogeneous nature. An analog physical signature device is inherently tamper-resistant and tamper-evident because intrusive attempts to physically examine and analyze such an analog physical signature device irreversibly alters the device and thereby destroys the capability of the analog physical signature device to generate the unique signature ascribed to it.

Figure 1:
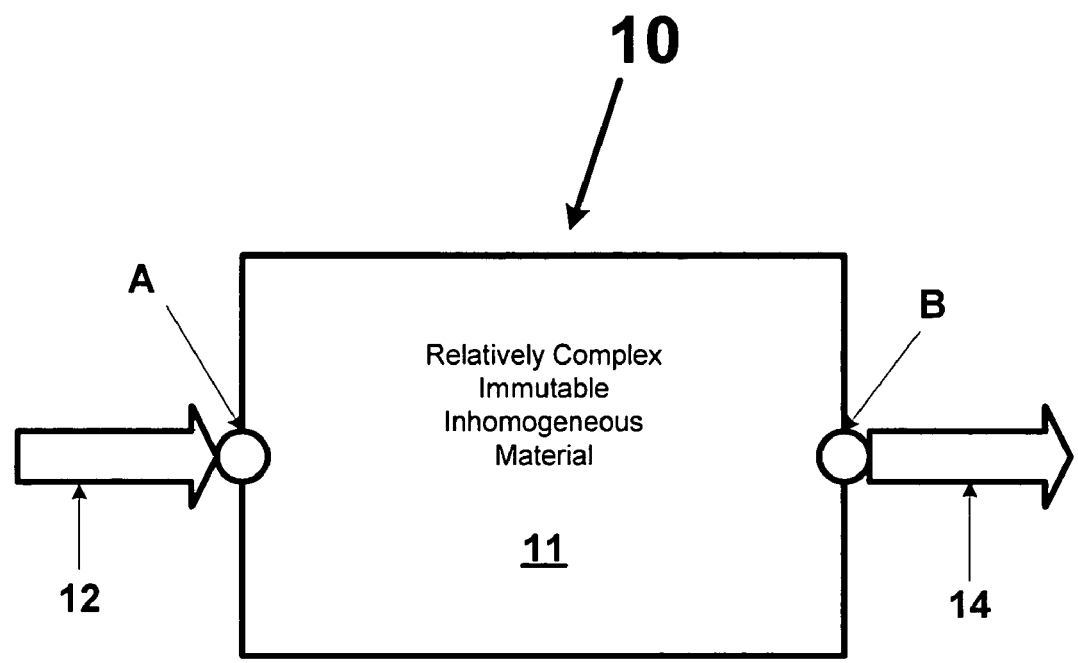
FIG. 1 is a schematic illustration of an analog physical signature device according to the present invention.

Referring now to the drawings wherein like reference numerals or characters identify corresponding or similar elements throughout the several views, FIG. 1 is a schematic illustration of an analog physical signature device 10 according to the present invention. The analog physical signature device 10 comprises a relatively complex, immutable ('immutable' is used in the sense that physical properties of the material are invariant over time unless the medium is subject to a deliberate externally-applied stimulus) inhomogeneous medium 11 that is configured and operative to generate, from a predetermined analog input provided by an analog input means 12, a consequent and dependent analog output (the terminology "consequent, dependent" as hereinafter used to define outputs means, that for any predetermined input, a 'unique' output is produced), detected by an analog detection means 14, that is unique to the individual analog physical signature device 10. In other words, the consequent, dependent analog output of the analog physical signature device 10 detected by analog detection means 14 represents and can suitably function as the unique signature of the analog physical signature device 10 for the predetermined analog input provided by analog input means 12. This unique signature, in turn, reliably and securely authenticates and uniquely identifies the analog physical signature device 10 and, concomitantly, an individual computer resource to which it is bound.

An analog physical signature device 10 according to the present invention overcomes the shortcomings of prior art digital physical signature devices in several respects.

First, the relatively complex, immutable, inhomogeneous medium contained in or comprising an individual analog physical signature device 10 has the property that it is, for practical purposes, impossible to reproduce with sufficient precision to duplicate the signature produced by the individual analog physical signature device 10 and as a consequence, creation of a duplicate of ("cloning") the individual analog physical signature device 10 is, for all practical purposes, statistically impossible.

Second, the relatively complex consequent, dependent analog output produced by and which uniquely identifies an individual analog physical signature device 10 is, for practical purposes, impossible to alter in such a way that it is mistaken for ("spoofing") the consequent, dependent analog output generated by another analog physical signature device from the same predetermined analog input.

Thus, the innate complexity of both the relatively complex, immutable, inhomogeneous nature of the analog physical signature device 10, and the relatively complex nature of its consequent, dependent analog output, provide protection against two well-known physical attacks, cloning and spoofing, on systems and methods for controlling use of computer resources using analog physical signature devices.

Third, invasive attempts to physically analyze and explore the signature generation capability of the relatively complex, immutable, inhomogeneous medium of the analog physical signature device 10 will alter the consequent, dependent analog outputs produced by the relatively complex, immutable, inhomogeneous medium, and thus will both destroy the capability of the analog physical signature device 10 to create its identifying signature and also make evident the invasion. Any interference with any consequent, dependent analog output in an attempt to alter it to represent the analog output of another analog physical signature device will destroy the identifying signature carried by such consequent, dependent analog output, likewise making evident the interference. As a result neither the analog physical signature device 10 nor the consequent, dependent analog outputs it produces require an additional or secondary protection system to protect their functional elements. Rather the inherent and indigenous nature of the analog physical signature device 10 and its consequent, dependent analog outputs simultaneously provide and protect such functionality.

Fourth, since the analog physical signature device 10 according to the present invention does not need to be built into the computer resource and since the analog input and output interface requirements of any particular analog physical signature device can be met using conventional, widely available analog input means 12 and analog detection means 14, the analog physical signature device 10 can be bound to a wide range of computer resources.

The analog physical signature device 10 according to the present invention creates a unique signature, i.e., consequent, dependent analog output, for each predetermined analog input, relying on the physical ("analog") properties and processes inherent to the relatively complex, immutable, inhomogeneous material 11, rather than computational ("digital") processes, to transform a particular input into a unique output.

For the purposes of clarity and understanding, the following paragraphs describe two illustrative and exemplary embodiments of the analog physical signature device 10 having utility in the practice of the present invention, one based on light waves and the other based on sonic waves. Those skilled in the art will recognized that radiation from any part of an acoustic or electromagnetic spectrum could similarly be employed, and accordingly, the invention of the present application is not intended to be limited by such exemplary embodiments.

Figure 2:
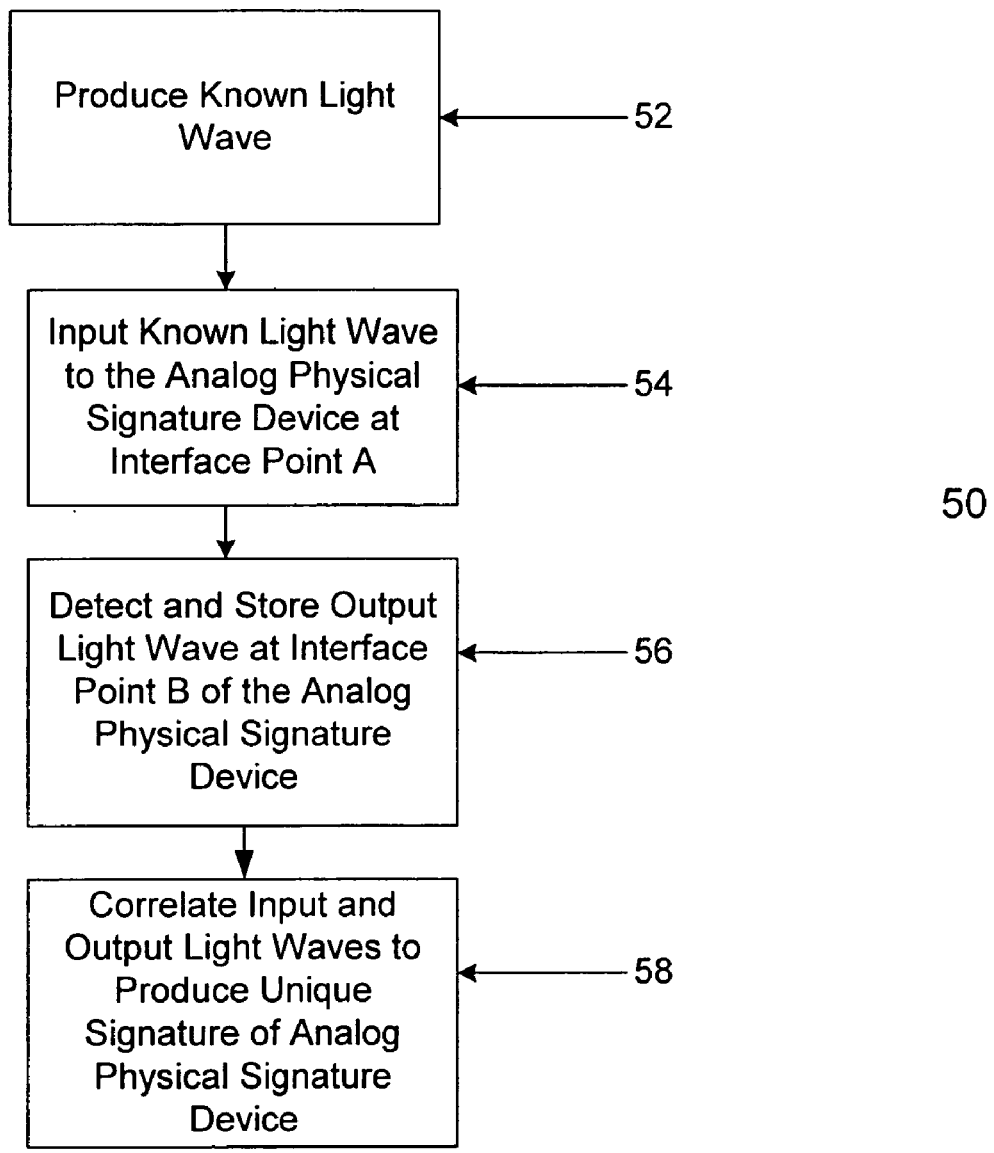
FIG. 2 illustrates an exemplary process for generating a unique signature using the analog physical signature device of the present invention and a predetermined light wave input.

For one class of embodiments of the analog physical signature device 10 according to the present invention, the particular physical process involves the transformation of a predetermined light wave input due to its interaction with, e.g., transmission through or reflection/refraction from, the relatively complex, immutable, inhomogeneous medium of the analog physical signature device 10. A unique physical signature is created by interacting a predetermined light wave with the relatively complex, immutable, inhomogeneous medium of the analog physical signature device 10 at a first known interface point A and detecting the transformation of this predetermined light wave produced by the relatively complex, immutable, inhomogeneous medium at a second known interface point B. The transformation of the predetermined input light wave to the consequent, dependent output light wave realized by the relatively complex, immutable, inhomogeneous medium is the signature that uniquely identifies the analog physical signature device 10. See FIG. 2 which illustrates an exemplary process for using the analog physical signature device 10 of the present invention to generate the unique signature of the analog physical signature device 10 by transforming a predetermined light wave input into a consequent, dependent light wave output.

Figure 3:
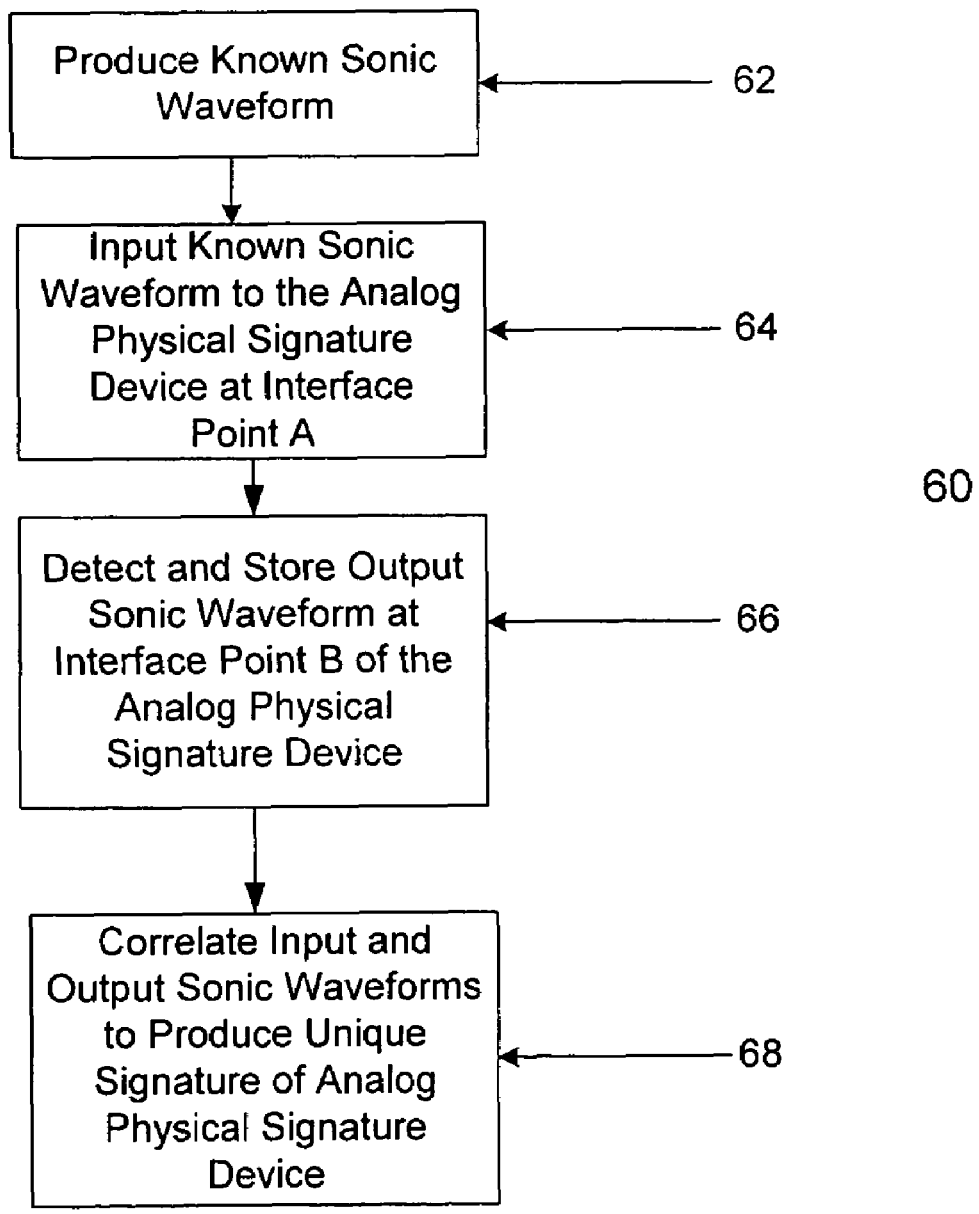
FIG. 3 illustrates an exemplary process for generating a unique signature using the analog physical signature device of the present invention and a predetermined sonic wave input.

For another class of embodiments of the analog physical signature device 10 according to the present invention, the particular physical process involves the transformation of a predetermined sonic wave due to its interaction with, e.g., transmission through or reflection/refraction from, a relatively complex, immutable, inhomogeneous medium of the analog physical signature device 10. A unique physical signature, i.e., consequent, dependent analog output, is created by interacting a predetermined sonic wave with the relatively complex, immutable, inhomogeneous medium comprising the analog physical signature device 10 at a first known interface point A and detection of the consequent, dependent output sonic wave resulting from the transformation of the predetermined sonic wave produced by the relatively complex, immutable, inhomogeneous medium out at a second known interface point B. The transformation of the predetermined input sonic wave to the consequent, dependent output sonic wave by the relatively complex, immutable, inhomogeneous medium is the signature that uniquely identifies the analog physical signature device 10. See FIG. 3 which illustrates an exemplary process for using the analog physical signature device 10 of the present invention to generate the unique signature of the analog physical signature device 10 by transforming a predetermined sonic wave input into a consequent, dependent sonic wave output.

Figure 4:
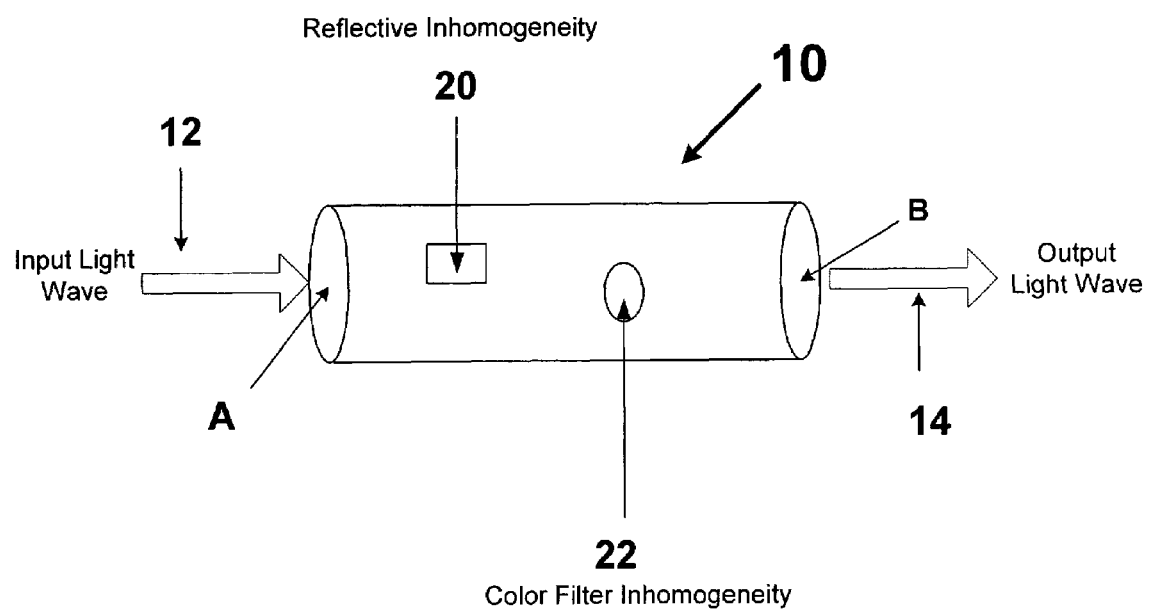
FIG. 4 illustrates a translucent rod embodiment of the analog physical signature device according to the present invention.

For the first class of embodiments of the analog physical signature device 10 according to the present invention, one preferred embodiment of the analog physical signature device 10 comprises a solid translucent rod 11, for example of acrylic plastic, having embedded therein small reflective flakes 20 and/or small translucent colored glass balls 22, as exemplarily illustrated in FIG. 4, that functions as the relatively complex, immutable, inhomogeneous material, a means 12 for inputting a predetermined light wave at the first known interface point A at one end of the translucent rod 11, and a means 14 for detecting the consequent, dependent light wave output at the second know interface point B at the other end of the translucent rod 11.

Figure 5:
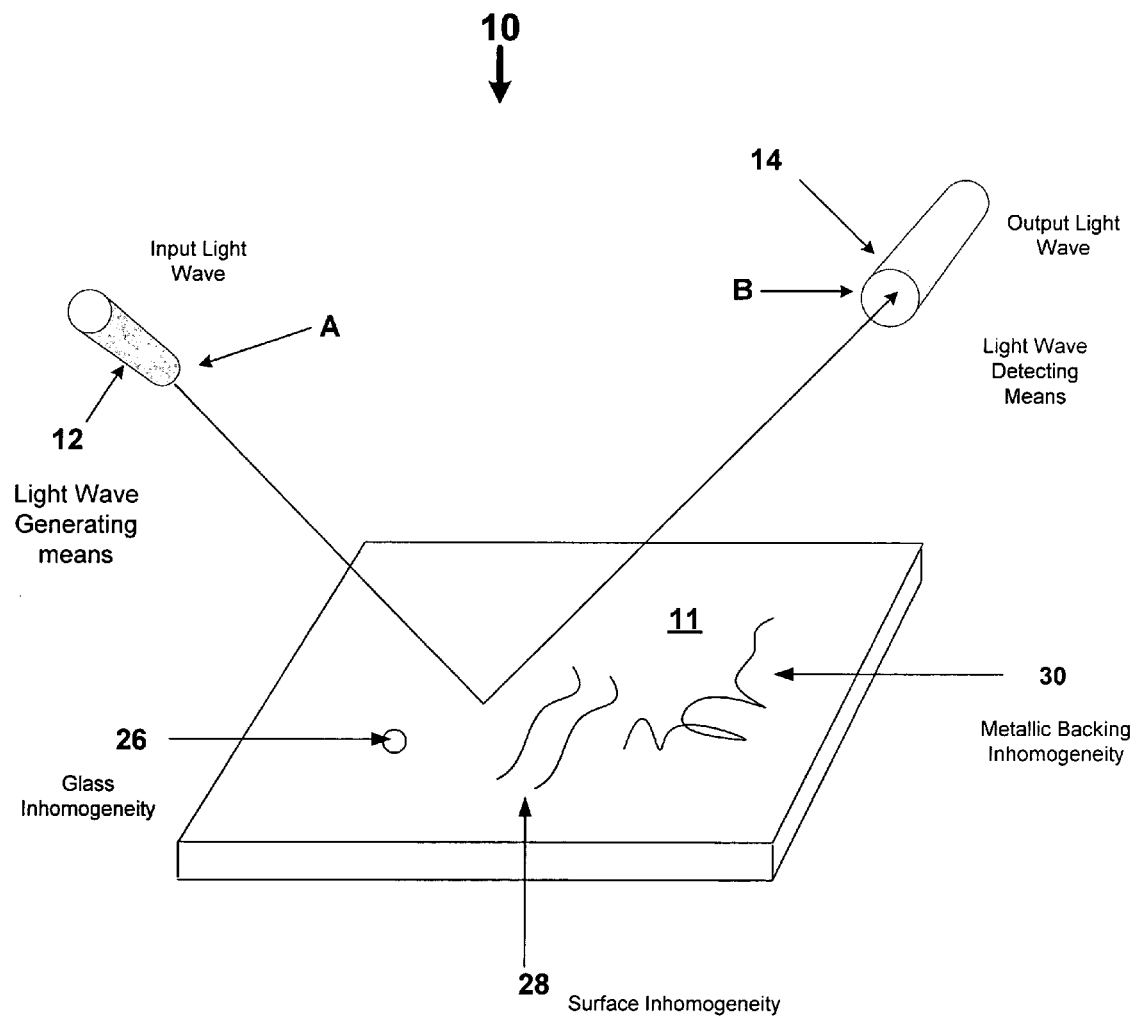
FIG. 5 illustrates an imperfect mirror embodiment of the analog physical signature device according to the present invention.

In another preferred embodiment of the analog physical signature device 10 using light waves, the relatively complex, immutable, inhomogeneous material of the analog physical signature device 10 comprises an imperfect mirror 11 made from glass with embedded impurities 26, e.g., air bubbles, and/or having surface irregularities 28, and/or an inhomogeneous metallic backing 30, as exemplarily illustrated in FIG. 5. The predetermined light wave input is directed onto the imperfect mirror 10 at a first known interface point A and the consequent, dependent light wave output, i.e., unique signature, is detected at a second known interface point B.

In the foregoing embodiments of the analog physical signature device 10 according to the present invention using light waves, and in all others constructed and operated so as to interact a predetermined light wave with a relatively complex, immutable, inhomogeneous medium 1, the nature of the transformation of the predetermined light wave input by the relatively complex, immutable, inhomogeneous medium 11 from the first known interface point A to the second known interface point B provides the consequent, dependent light wave output that uniquely identifies the analog physical signature device 10, and, concomitantly, the computer resource to which the analog physical signature device 10 has been bound.

Figure 6:
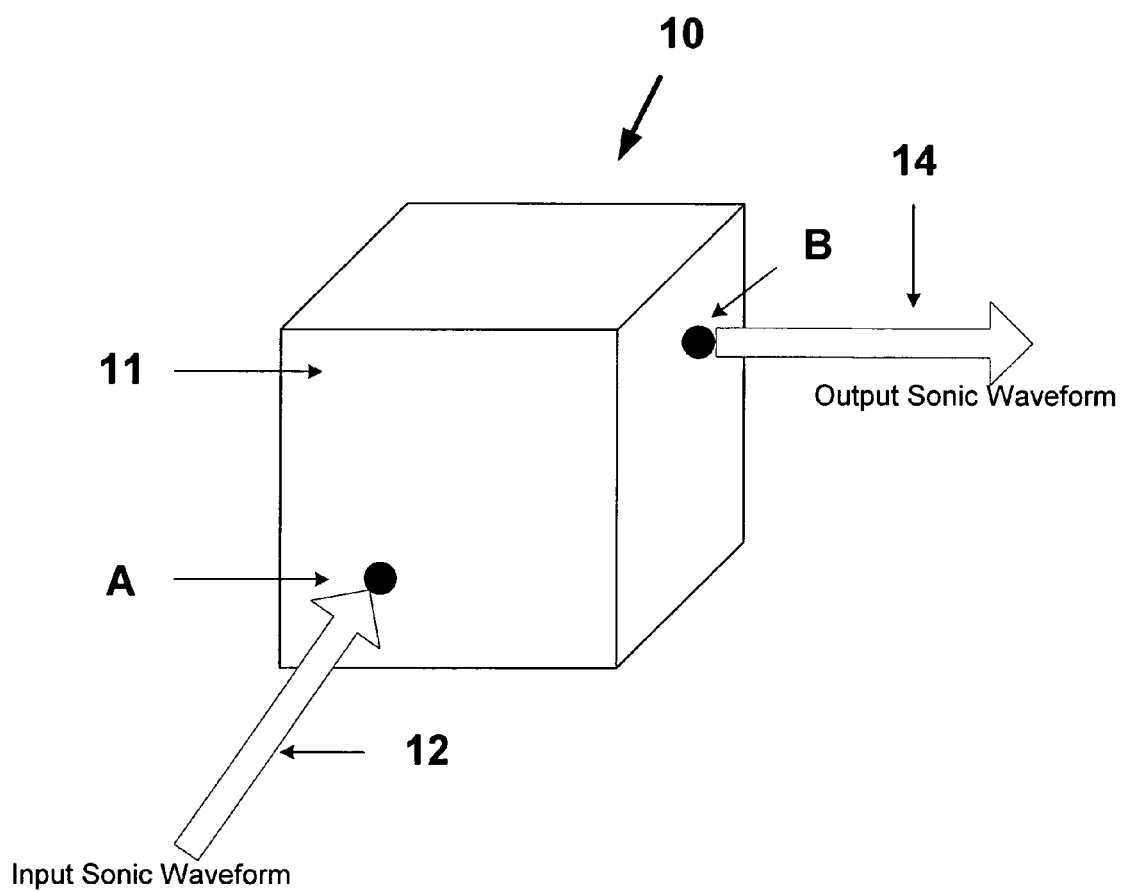
FIG. 6 illustrates a solid block embodiment of the analog physical signature device according to the present invention.

For the second class of embodiments of the analog physical signature device 10 according to the present invention, one preferred embodiment of the analog physical signature device 10 comprises a solid block 11 of relatively complex, immutable, inhomogeneous material, a means 12 to direct a predetermined sonic wave at a first known interface point A in the volume of the block 11, and a means 14 to detect the consequent, dependent sonic wave output at a second known point B in the volume of the block 11 as exemplarily illustrated in FIG. 6.

In another preferred embodiment of the analog physical signature device 10 using sonic waves, the relatively complex, immutable, inhomogeneous material 11 comprises a closed hollow container filled with a viscous fluid, a means 12 to direct a predetermined sonic wave at a first known interface point A in the volume of the fluid, and a means 14 for detecting the consequent, dependent sonic wave output at a second known interface point B in the volume of the viscous fluid.

In yet another preferred embodiment of the analog physical signature device 10 using sonic waves, the relatively complex, immutable, inhomogeneous material 11 comprises a disc of porous sintered metal, a means 12 to direct a predetermined sonic wave at a first known interface point A of the porous sintered metal disc, and a means 14 to detect the consequent, dependent sonic wave output at a second known interface point B of the porous sintered metal disc.

In yet another preferred embodiment of the analog physical signature device 10 using sonic waves, the relatively complex, immutable, inhomogeneous material 11 comprises closed hollow container filled with ringing metal objects such as tuning forks and bells, a means 12 to direct a predetermined sonic wave at a first known interface point A in the volume of metal objects, and a means 14 to detect the consequent, dependent sonic wave output at a second known interface point B in the volume of the metal objects.

In yet a further preferred embodiment of the analog physical signature device 10 using sonic wave, the relatively complex, immutable, inhomogeneous material 11 comprises a membrane stretched over a rigid body or frame, a means 12 to direct a predetermined sonic wave at a first known interface point A on the stretched membrane 11, and a means 14 for detecting the consequent, dependent sonic wave output at a second known interface point B on the membrane.

In the foregoing embodiments of the analog physical signature device 10 according to the present invention using sonic waves, and in all others constructed and operated so as to interact a predetermined sonic wave with a relatively complex, immutable, inhomogeneous medium 11, the nature of the transformation of the predetermined sonic wave input by the relatively complex, immutable, inhomogeneous medium 11 from the first known interface point A to the second known interface point B provides a consequent, dependent sonic wave output that uniquely identifies the analog physical signature device 10, and, concomitantly, the computer resource to which the analog physical signature device 10 is bound.

Binding an Analog Physical Signature Device to a Computer Resource

The following paragraphs describe one preferred method for binding an analog physical signature device to a computer software resource to define an interactive system that controls the use of such computer software resource for its intended purpose according to the present invention. In the case that the computer software resource is operative to define the functionality of a computer hardware resource—such as software embedded in a disc or a printer—the method binds the analog physical signature device to the computer hardware resource. In both cases the computer resource performs correctly if and only if it is operated in association with the analog physical signature device to which it has been bound. Thus we henceforth speak without loss of generality of binding a computer program to an analog physical signature device without differentiating between the cases that the computer program is a part of a computer hardware resource or is in the form of a computer software resource. Thus, the terminology computer software resource or computer program as used herein embraces instructions that any digitally programmed device executes to realize a defined and predetermined functionality, including but not limited to application programs, operating systems, basic input/output systems, and embedded program instructions for hardware resources such as computer peripherals, industrial machines and consumer products.

The binding of a computer program to an analog physical signature device according to the present invention embeds the unique output from an individual analog physical signature device into the computer instructions comprising the computer program, and thereby merges in an inseparable manner the relatively complex, immutable, inhomogeneous and unique properties of the individual analog physical signature device and the functionality of the computer program. As a consequence of the method and system of the present invention, the computer resource will function correctly if and only if it is operated in association with the analog physical signature device to which it has been bound. Furthermore as a consequence of the method and system of the present invention, to excise or bypass the computer instructions bound to the analog physical signature device would be tantamount to excising or bypassing the functionality that the computer resource is intended to perform, essentially rendering the computer resource useless for its intended functionality.

Any useful computer program makes use of constant values. Constant values may be used in a computer program to conditionally or unconditionally branch from one instruction in the computer program to another instruction in the computer program (a "logical" constant). Constant values may also be used as indexes and offsets into arrays of data (a "pointer" constant). Constant values may also be used to position text or graphics that are displayed to the user of the program for the purpose of operating the program and indeed the text and graphics themselves may be represented by sequences of constant values (a "representational" constant). Constant values may also be used as means to send messages to other computer programs (a "message" constant). Finally, in computer programs involving scientific calculations, constant values may be used in scientific formulae and mathematical equations (a "computational" constant). Collectively, any of the constant values of a useful computer program, as exemplarily illustrated by means of the foregoing examples, are defined herein as program constants.

Any useful computer program also makes use of variable values. Variable values may be used in a computer program to hold input to the computer program (an "input" variable). Variable values may also be used in a computer program to hold intermediate results (an "intermediate result" variable). Variable values may also be used in a computer program to hold the memory address of data or instructions (a "pointer" variable). Variable values may also be used in a computer program to hold output from the computer program (an "output" variable). Collectively, any of the variable values of a useful computer program, as exemplarily illustrated by means of the foregoing examples, are defined herein as program variables.

Any useful computer program also makes use of functions of program constants and program variables. Functions of program constants and program variables may be used in a computer program to compute offsets into program data structures (an "offset" function). Functions of program constants and program variables may also be used in a computer program to compute the size of program data structures (a "size" function). Functions of program constants and program variables may also be used in a computer program to compute positions in input or output formats (a "format" function). Functions of program constants and program variables may also be used in a computer program to compute mathematical and scientific values (a "mathematical or scientific" function). Collectively, any of the functions of program constants and program variables of a useful computer program, as exemplarily illustrated by means of the foregoing examples, are defined herein as program functions.

Figure 7:
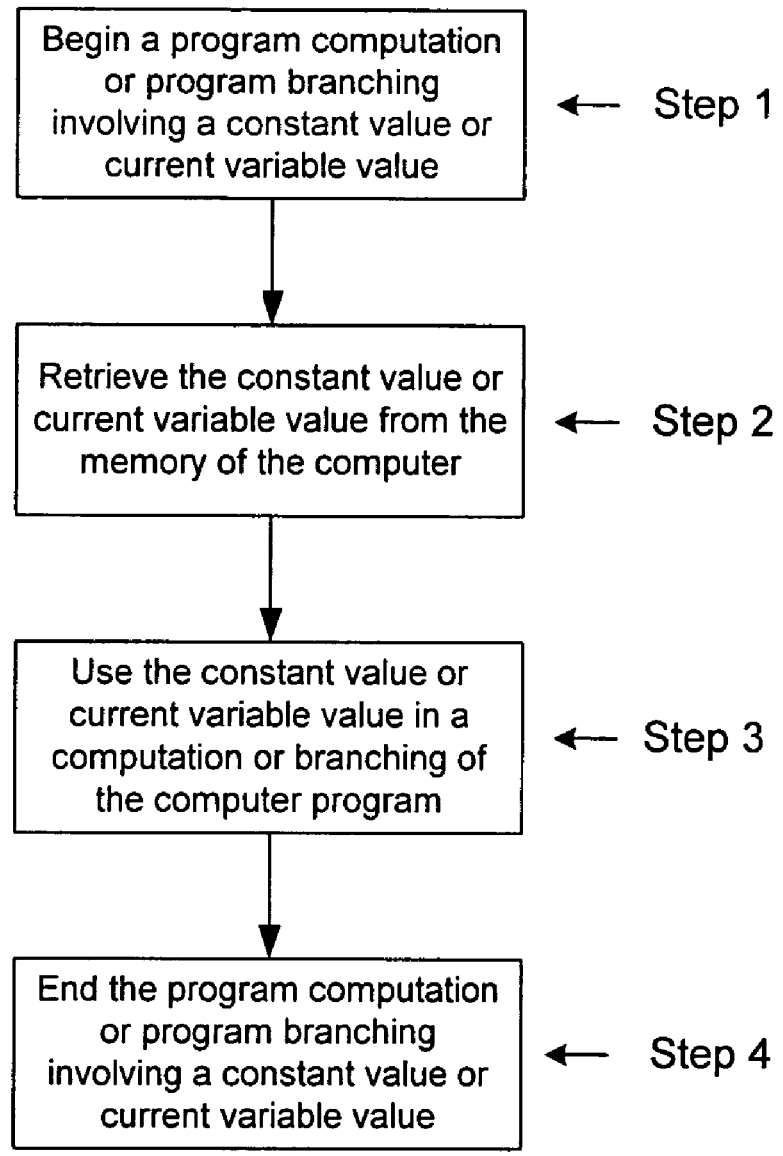
FIG. 7 illustrates the use of a program constant 'c' by a computer program as known in the prior art.

Such program constants, program variables, and/or program functions, individually, collectively, and/or in any combination, are defined hereinafter using the terminology "program expression". During conventional execution of a computer program embodying any such program expressions, these program expressions are processed by the instructions comprising the computer program as exemplarily illustrated in the method of FIG. 7.

In a preferred embodiment of a method and interactive system according to the present invention, an individual analog physical signature device is bound to an individual computer program by replacing the code segment (the terminology 'code segment' as used herein encompasses both the singular and plural) representing a selected program expression in the computer program with an alternative code segment that is a function of the unique output from the individual analog physical signature device. The inventive consequence of such replacement is that the individual computer program will perform consistent with its intended purpose if and only if it is operated in association with the individual analog physical signature device to which it has been bound. Another inventive consequence of this alteration is that the individual computer program is difficult to reverse engineer.

It is to be understood that a plurality of program expressions in a computer program can be replaced with alternative code segments to strengthen the binding of the computer program to the analog physical signature device. In such applications, each program expression is replaced by a specific alternative code segment that has a singular correspondence to such replaced program expression.

Interactive System:

The analog physical signature device that is bound to the computer program in this interactive system is operative to transform a predetermined analog signal input to a consequent, dependent (unique) analog signal output. The bound computer program, including the alternative code segment embedded therein that binds the computer program to the analog physical signature device, is only executable using digital values.

The interactive system, therefore, includes conversion means that are operative to realize causal relationships between digital values and analog signals to ensure the proper functioning of both the computer program (using digital values) and the analog physical signature device (using analog signals) to which it is bound. More specifically, the interactive system includes a digital-to-analog (D/A) conversion means 16 (see FIG. 11) that is operative to realize the causal relationship between a predetermined digital input, which is defined by the alternative code segment, and a predetermined analog input for the bound analog physical signature device. The interactive active system further includes an analog-to-digital (A/D) conversion means 18 (see FIG. 11) that is operative to realize the causal relationship between the consequent, dependent analog output produced by the analog physical signature device and a predefined digital output that is used in the program functionality of the bound computer program.

Figure 11:
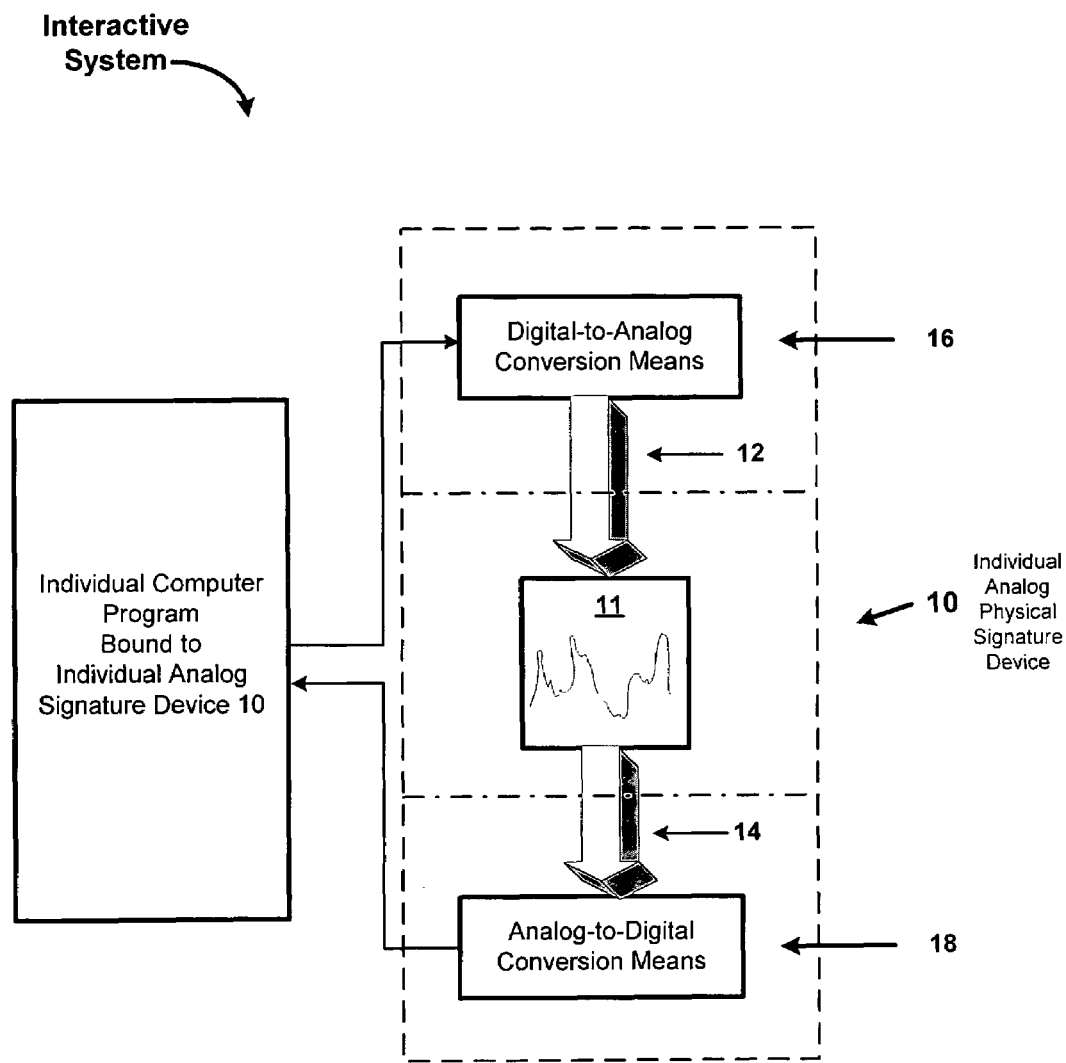
FIG. 11 illustrates one preferred embodiment of a specific analog physical signature device for the execution method depicted in FIG. 10.

Referring to FIG. 11, which depicts an interactive system according to the present invention, the conversion means 16, 18 can be implemented as elements of the analog physical signature device 10, as illustrated by the larger dashed rectangle. Alternatively, the conversion means 16, 18 can be implemented as elements separate and distinct from the analog physical signature device 10, as illustrated by the smaller dashed rectangle. In these alternative embodiments, the conversion means 16, 18 can be implemented as stand-alone hardware or implemented as part of the digitally-programmed hardware that holds the bound computer program.

There are in the current art many means for causally relating a digital value to an analog signal and many means for causally relating an analog signal to a digital value. For example, digital-to-analog (D/A) converters are known prior art devices or means that are operative to provide the causal relationship function by converting digital values to an analog signal. Similarly, analog-to-digital (A/D) converters are known prior art devices or means that are operative to provide the causal relationship function by converting an analog signal to digital values. An example of an digital-to-analog converter is described and claimed in U.S. Pat. No. 4,412,208 (Digital to analog converter). An example of an analog-to-digital converter is described and claimed in U.S. Pat. No. 5,570,091 (Analog-to-digital converter). These types of D/A and A/D conversion means have particular utility in the interactive systems described in Examples 3-5 below.

Or, for example, a mapping function can be implemented as the conversion means to define the causal relationship between digital values and analog signals. Such a mapping function would be operative to causally relate (by mapping) each predetermined digital input 'x' to a predetermined analog input, $f_x(t)$. The predetermined analog input $f_x(t)$ is transformed by interaction with the analog physical signature device into the consequent, dependent analog output $g_x(t)$. The mapping function would be further operative to causally relate (by mapping) the consequent, dependent analog output $g_x(t)$ to a predefined digital output 'y'. The causal relationships defined by such mapping functions may be arbitrary or may be associated with particular parameters of the analog signals. This type of D/A and A/D conversion means have particular utility in the interactive systems described in Examples 1-2 below.

The digital-to-analog conversion means and analog-to-digital conversion means used in embodiments of the method and interactive system of the present invention use hardware conversion means or software conversion means or a combination of hardware and software conversion means to realize such causal relationships. The realization of these means in the context of a specific embodiment of the method and interactive system of the present invention depends on both technical and economic considerations of the computer resource whose use is being controlled and the analog physical signature device being employed. For the purpose of the describing of method and interactive system of the present invention, these conversion means need not be detailed beyond being a transformation from the digital domain to the analog domain and a transformation from the analog domain to the digital domain, respectively, inasmuch as the selection and implementation of such conversion means are within the capabilities of one skilled in the art.

EXAMPLE 1

Binding Tabular Response to a Program Constant

By way of a simple explanatory example, assume we have a two different individual analog physical signature devices D={$d_1$, $d_2$}. For the purposes of this simple example, assume each analog physical signature device $d_i$ is a function from a set of integers X to a set of integers Y, i.e., $d_i$: X→Y in such a way that $d_1(x) \neq d_2(x)$ for all x in X. Table 1 shows X and the mapping of both $d_1$ and $d_2$ from X to Y.

TABLE 1

| Two Analog Physical Signature Devices | | |
|---|---|---|
| x | y = $d_1$(x) | y = $d_2$(x) |
| 7 | 6 | 34 |
| 8 | 19 | 37 |
| 9 | 21 | 23 |
| 10 | 18 | 17 |
| 11 | 12 | 47 |

In this case X={7, 8, 9, 10, 11} and Y={6, 12, 17, 18, 19, 21, 23, 34, 37, 47}.

Suppose the source code of the computer program to be bound to devices from the collection of analog physical signature devices D, were the following:

READ I FROM FILE "Input"

IF (I>10) GO TO 1

J=I+3                                                            Example 1A

GO TO 2

1 J=I-7

2 WRITE J TO FILE "Output"

where the input I is assured to be an integer between 1 and 20.

During the execution of this computer program, the constant value '10' in the second line is used to conditionally branch from one instruction in the program to another instruction in the program depending upon the value of I read from the file "Input". For any value of the input I greater than the constant value, '10', the program branches unconditionally to the statement labeled with the constant value '1'. This causes the value of J to be set equal to the value of 1 minus the constant value '7', which is written to the file "Output". If the value of the input I is less than or equal to the constant value '10', however, then the value of J is set equal to the value of I plus the constant value '3' and the program branches unconditionally to the statement labeled with the constant value '2', where the value of J is written to the file "Output".

By a preferred embodiment of the present invention, to bind this computer program to the analog physical signature device $d_1$, we replace one or more program constants in the computer program with the unique output from the analog physical signature device $d_1$. For example, we could replace the constant value '3' in the third line (the computational constant) with the unique output from $d_1$ when x is 8. This transformation of the computer program of Example 1A yields the computer program in Example 1B:

READ I FROM FILE "Input"

IF (I>10) GO TO 1

J=I+$d_1$(8)-16

GO TO 2                                                         Example 1B

1 J=I-7

2 WRITE J TO FILE "Output"

Here we have $d_1$(8) equal to 19 from Table 1 and 19-16 is 3, which is the constant value necessary in the second line for the correct functioning of the program.

Let PhySig(x) denote the interactive system and method that defines the predetermined digital input 'x' that is causally related to the predetermined analog input to an analog physical signature device, which returns a predefined digital output that is causally related to the consequent, dependent analog output from the analog physical signature device. This PhySig(x) function, in addition to defining the predetermined digital input 'x' for the interactive system and method according to the present invention, also includes a mathematical formulation that is embedded in the bound computer program (see Table 3 below, column labeled $T_G$) as well as instruction sets for: (i) realizing the causal relationship between the predetermined digital input 'x' and the predetermined analog input; (ii) realizing the causal relationship between the consequent, dependent analog output and the predefined digital output; (iii) retrieving the predefined digital output; and (iv) processing the embedded mathematical formulation using the predefined digital input. Using the PhySig(x) function as defined herein, the binding of the computer program to the analog physical signature device $d_1$ can be expressed as:

READ I FROM FILE "Input"

IF (I>10) GO TO 1

J=I+PhySig(8)-16

GO TO 2                                                         Example 1C

1 J=I-7

2 WRITE J TO FILE "Output"

If this computer program is executed in association with the analog physical signature device $d_1$, then the program will function correctly, as described above, for all values of I. If, on the other hand, this computer program is executed in association with analog physical signature device $d_2$, then this computer program will not function correctly for all values of I. In particular when I is less than or equal to the constant value 10, from the $d_2$ column in Table 1 PhySig(8) will return 37, and J will be set to I plus PhySig(8)-16=21 and therefore, the computer program will not function correctly for values of I≦10.

Figure 8:
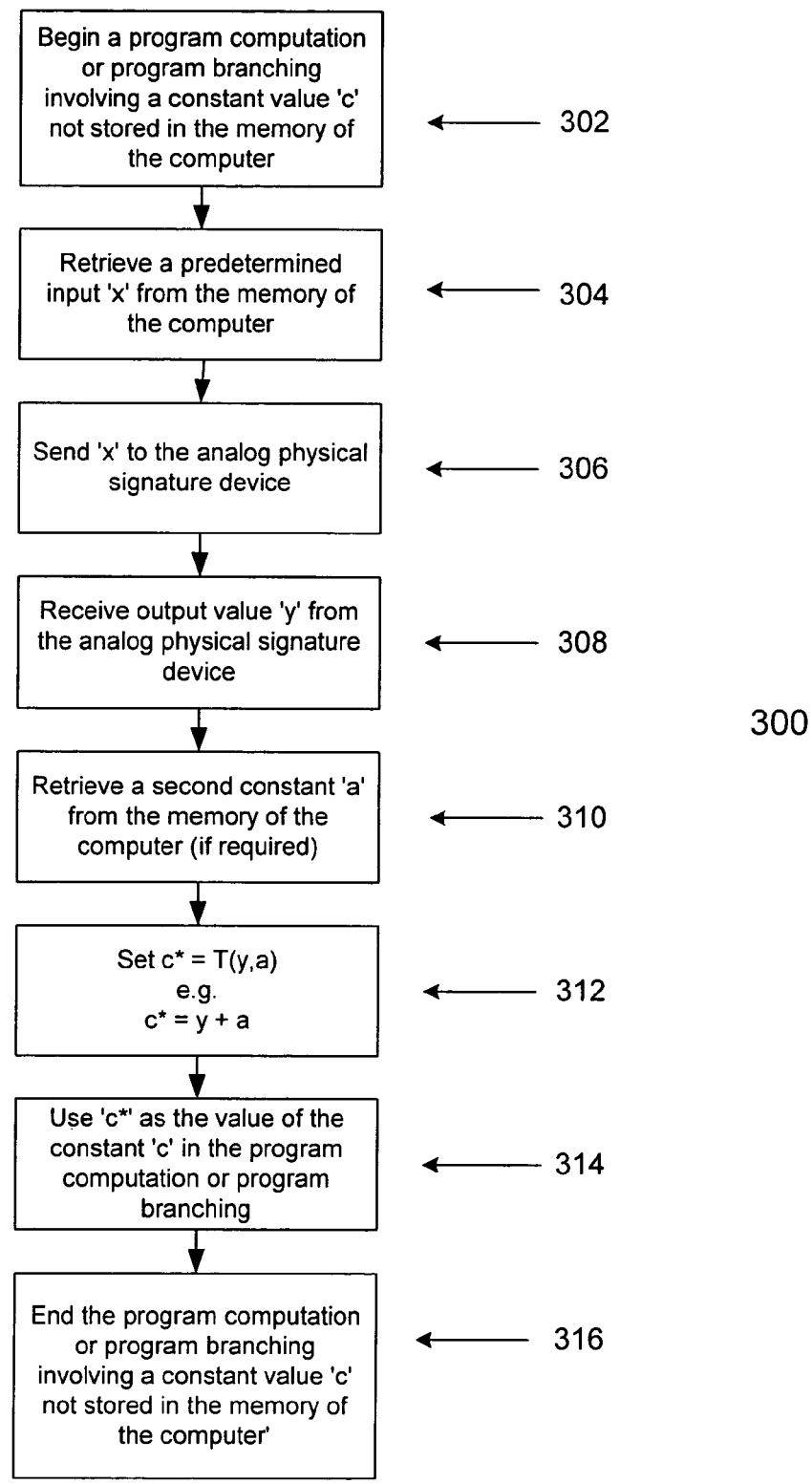
FIG. 8 illustrates the steps implemented by a computer program in using a constant 'c' in a computation where a Binding Transformation according to the present invention has been applied to the constant 'c' in the computer program.

In the foregoing example, the predetermined digital input '8' is defined by the PhySig(8) function of the analog physical signature device, and the expression "PhySig(8)-16" is the 'alternative code segment', which includes the embedded mathematical expression "y-16" (see column $T_G$ in Table 3), that replaces the program constant "3" in the computer program. The predefined digital output for this particular example is '19', the value of 'y' in Table 1 for the predetermined digital input '8'. The functional procedure described in the preceding paragraphs wherein the code segment representing a program constant is replaced by an 'alternative code segment' is exemplarily illustrated in FIG. 8.

The binding of the computer program to analog physical signature device $d_1$ can be strengthened by replacing all constant values in the computer program with calls to PhySig such that each call sends a different input value to the analog physical signature device. The result is as follows:

READ I FROM FILE "Input"

IF (I>PhySig(7)+4) GO TO (PhySig(9)-20)

J=I+PhySig(8)-16

GO TO PhySig(11)-10                                             Example 1D

1 J=I+PhySig(10)-25

2 WRITE J TO FILE "Output"

In the example described above, a "binding" constant was added to or subtracted from the value returned by the analog physical signature device function PhySig. For example, the binding constant 16 was subtracted from PhySig(8), the binding constant 4 was added to PhySig(7), to recover the corresponding original program constants 3 (third line) and 10 (first line), respectively, of the computer program. One skilled in the art will appreciate that mathematical functions and operations other than addition and subtraction such as multiplication, division, and exponentiation, can be used to uniquely recover an original and replaced program constant value from the value returned by the PhySig function.

EXAMPLE 2

Binding a Tabular Response to a Program Function

As a second simple explanatory example, assume we have a two different individual analog physical signature devices D={$d_1$, $d_2$}. For the purposes of this second simple example, assume each analog physical signature device $d_i$ is a function from a set of rational numbers X to a set of rational numbers Y, i.e., $d_i$: X→Y in such a way that $d_1(x) \neq d_2(x)$ for all x in X. Table 2 shows X and the mapping of both $d_1$ and $d_2$ from X to Y for $$d_i(x) = i - \frac{i}{x^i}.$$

TABLE 2

Two Analog Physical Signature Devices

| x | y = $d_1(x)$ | y = $d_2(x)$ |
|---|---|---|
| 7.0 | $\frac{6}{7}$ | $\frac{96}{49}$ |
| 8.0 | $\frac{7}{8}$ | $\frac{63}{32}$ |
| 9.0 | $\frac{8}{9}$ | $\frac{160}{81}$ |
| 10.0 | $\frac{9}{10}$ | $\frac{99}{50}$ |
| 11.0 | $\frac{10}{11}$ | $\frac{240}{121}$ |

Suppose the source code of the computer program to be bound to devices from the collection of analog physical signature devices D, were the following:

READ X FROM FILE "Input"

$Z=5*X**2+3*X$     Example 2A

WRITE Z TO FILE "Output"

where the input X is assured to be a floating point number between 1 and 20.

By the preferred embodiment of the present invention, to bind this computer program to the analog physical signature device $d_2$, we replace the expression in line two in the computer program with an expression in the unique output from the analog physical signature device $d_2$. This transformation of the computer program of Example 2A yields the computer program in Example 2B:

READ X FROM FILE "Input"

$Z=10/(2-PhySig(X))+3*SQRT(2/(2-PhySig(X)))$   Example 2B

WRITE Z TO FILE "Output"

This transformation of the program of Example 2A will compute the correct value for Z if the program is used in association with the analog physical signature device $d_2$ and the incorrect value for Z if it is used in association with the analog physical signature device $d_1$.

In the foregoing example, the predetermined digital input 'X' is defined by the PhySig(X) function of the analog physical signature device, and the expression "10/(2−PhySig(X))+3*SQRT(2/(2−PhySig(X)))" is the 'alternative code segment', which includes the embedded mathematical expression $$"\frac{10}{2-y} + 3\sqrt{\frac{2}{2-y}}"$$

(see column $T_G$ in Table 3), that replaces the program function "$5X^2+3X$" in the computer program. The predefined digital output for this particular example is the particular value of 'y' in Table 2 for any predetermined digital input 'X'.

EXAMPLE 3

Binding a Waveform Response to a Program Constant

Let $output_\omega(t) = a_0(\omega) + a_1(\omega)\sin(\omega t) + b_1(\omega)\cos(\omega t) + a_2(\omega)\sin(2\omega t) + b_2(\omega)\cos(2\omega t)$ be the output waveform of the relatively complex, immutable, inhomogeneous medium comprising an analog physical signature device d in the set D when presented with the input waveform $input_\omega(t) = \sin(\omega t)$ Suppose the computer program that is to be bound to an individual analog physical signature device $d_1$ in D with output given by $output_{1,\omega}(t) = 7 + 8\sin(\omega t) + 9\cos(\omega t) + 10\sin(2\omega t) + 11\cos(2\omega t)$ is as follows:

READ X FROM FILE "Input"

IF (X>10.0) GO TO 1

$Z=X+3.0$     Example 3A

GO TO 2

1 $Z=X-7.0$

2 WRITE Z TO FILE "Output"

where the input X is assured to be a floating point number between 1 and 20.

By a preferred embodiment of the present invention, to bind this computer program to the analog physical signature device $d_1$, we replace the program constant "3" of the computer program with the unique output from the analog physical signature device $d_1$. If we take PhySig(X) to be the constant term of the above representation of the output waveform of the analog physical signature device, $PhySig(X) = a_0(X)$ then the transformation of the third line of the computer program of Example 3A yields the computer program in Example 3B:

READ X FROM FILE "Input"

IF (X>10.0) GO TO 1

Z=X+PhySig(X)/2.33            Example 3B

GO TO 2

1 Z=X-7.0

2 WRITE Z TO FILE "Output"

In the foregoing example, the predetermined digital input 'X' is defined by the PhySig(X) function of the analog physical signature device, and the expression "PhySig(X)/2.33" is the 'alternative code segment', which includes the embedded mathematic expression "y/2.33" (see column $T_G$ in Table 3), that replaces the program constant "3" in the computer program. The predefined digital output for this particular example is the value of 'y' that is causally related to the predetermined digital input 'X' read from the file "Input", e.g., for the specified conditions above, 'y' equals the constant "7" for all values of 'X'.

EXAMPLE 4

Binding a Waveform Response to a Program Variable

Assume that upon encountering PhySig(x) during the execution of the computer program causes the waveform $w_x(t) = xu(t)$ to be sent to the analog physical signature device where u(t) is the unit step function, $$u(t) = \begin{cases} 1 & t \geq 0 \\ 0 & t < 0 \end{cases}$$

Suppose further that the impulse response of the relatively complex, immutable, inhomogeneous medium comprising the analog physical signature device d in the set D is given by $h_d(t) = de^{-dt}u(t)$ where d is an integer between 1 and 100 that identifies a specific analog physical signature device. Then the output of device d when presented with input PhySig(x) is given by $q_d(t) = x(1-e-dt)$ If we define the value of PhySig(x) as a function of this output to be the amplitude of the waveform at time t=2, $PhySig(x) = q_d(2) = x(1-e^{-2d})$ then in order to bind the individual analog physical signature device $d_1$ with impulse response $h_1(t) = e^{-t}u(t)$ to the appearance of the program variable X in the third line of the computer program in Example 4A READ X FROM FILE "Input"

IF (X>10.0) GO TO 1

Z=X+3.0            Example 4A

GO TO 2

1 Z=X-7.0

2 WRITE Z TO FILE "Output"

to individual analog physical signature device $d_1$, we would replace the appearance of the variable X in this line by PhySig(X)/(1-e^{-2}) to yield the computer program in Example 4B.

READ X FROM FILE "Input"

IF (X>10.0) GO TO 1

Z=0.8808*PhySig(X)+3.0            Example 4B

GO TO 2

1 Z=X-7.0

2 WRITE Z TO FILE "Output"

where the input X is assured to be a floating point number between 1 and 20.

In the foregoing example, the predetermined digital input 'X' is defined by the PhySig(X) function of the analog physical signature device, and the expression "0.8808*PhySig(X)" is the 'alternative code segment', which includes the embedded mathematical expression $$\text{``} \frac{y}{(1-e^{-2})} \text{''}$$

Figure 9:
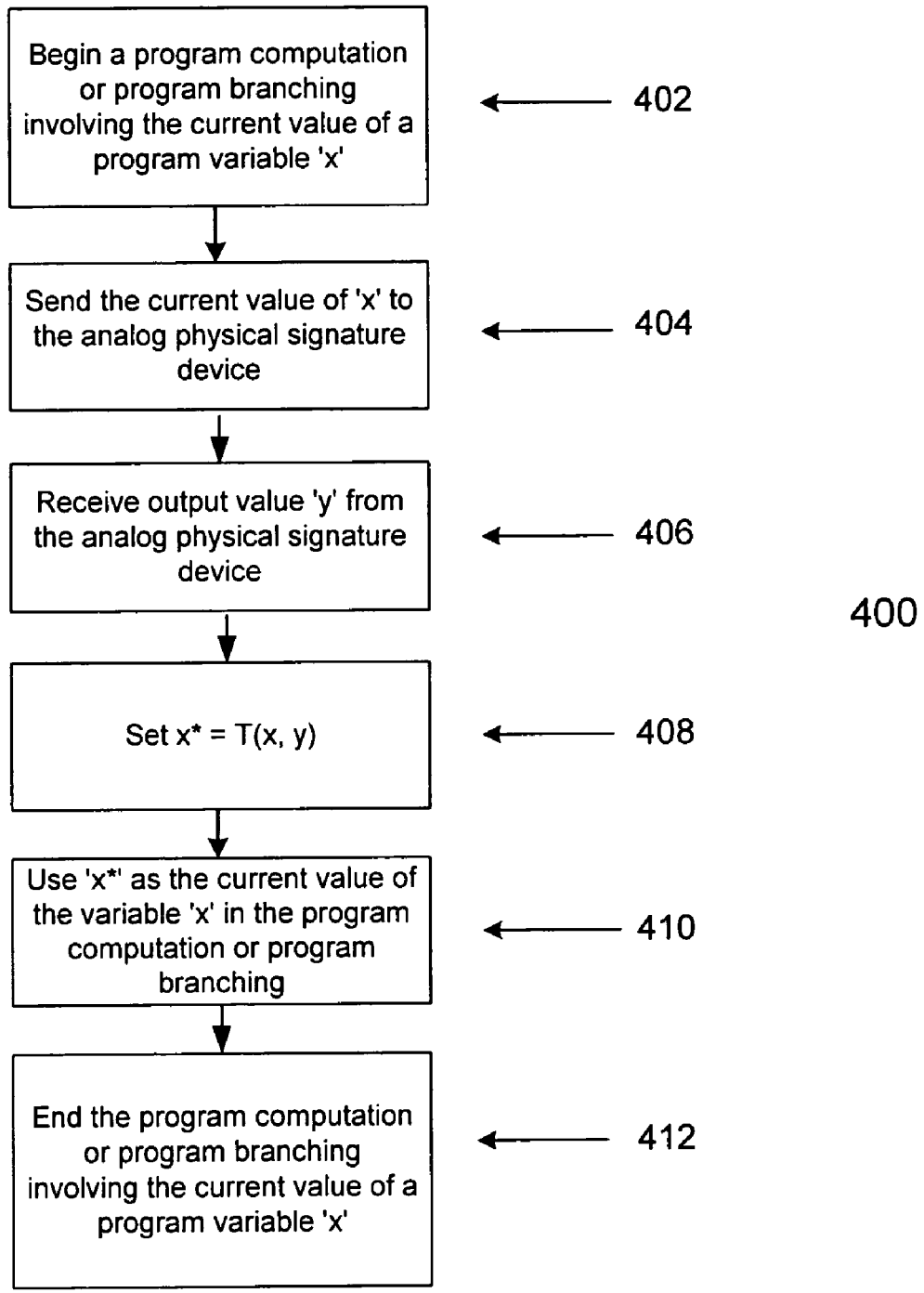
FIG. 9 illustrates the steps implemented by a computer program where a Binding Transformation according to the present invention had been applied to a program variable 'x' in the computer program.

(see column $T_G$ in Table 3), that replaces the program variable "X" in line 3 of the computer program. The predefined digital output for this particular example is the value of 'y' that is causally related to the predetermined digital input 'X' read from the file "Input". The functional procedure described in the preceding paragraphs wherein the code segment representing a program variable is replaced by an 'alternative code segment' is exemplarily illustrated in FIG. 9.

EXAMPLE 5

Binding a Waveform Response to a Program Function

Assume that upon encountering PhySig(x) during the execution of the computer program causes the waveform $w_x(t) = \sin(xt)$ to be sent to the analog physical signature device.

Suppose further that the impulse response of the relatively complex, immutable, inhomogeneous medium comprising the analog physical signature device d in the set D is given by $h_d(t) = de^{-dt}u(t)$ where d is an integer between 1 and 100. Then the output of device d when presented with input PhySig(x) is given by $$q_d(t) = d \frac{d\sin(xt) - x\cos(xt)}{x^2 + d^2}$$

If we define the value of PhySig(x) as a function of this output to be the amplitude of the waveform at t=0, $$PhySig(x) = q_d(0) = \frac{-dx}{x^2 + d^2},$$

then in order to bind the individual analog physical signature device $d_1$ with impulse response $$h_1(t) = e^{-t}u(t)$$

to the appearance of the function $x^2$ of x in the third line of the computer program in Example 5A,

```
READ X FROM FILE "Input"

IF (X>10.0) GO TO 1

Z=X**2                                          Example 5A

GO TO 2

1 Z=X-7.0

2 WRITE Z TO FILE "Output"
``` to individual analog physical signature device $d_1$, we would replace $x^2$ by $$\frac{-x}{PhySig(x)} - 1$$

to yield the computer program bound to individual analog physical signature device $d_1$ shown in Example 5B.

```
READ X FROM FILE "Input"

IF (X>10.0) GO TO 1

Z=-X/PhySig(X)-1                                Example 5B

GO TO 2

1 Z=X-7.0

2 WRITE Z TO FILE "Output"
``` where the input X is assured to be a floating point number between 1 and 20.

In the foregoing example, the predetermined digital input 'X' is defined by the element 'X' in the PhySig(X) function of the analog physical signature device, and the expression "X/PhySig(X)" is the 'alternative code segment', which includes the embedded mathematical expression $$\text{``}\frac{-x}{y} - 1\text{''}$$

(see column $T_G$ in Table 3) that replaces the program function "$X^2$" in line 3 of the computer program. The predefined digital output for this particular example is the value of 'y' that is causally related to the predetermined digital input 'X' read from the file "Input".

The Binding Transformation

Henceforth, we will refer to a program constant, a program variable or a program function as a program expression and to the process of replacing a program expression of a computer program with an expression involving the PhySig function as an application of the Binding Transformation. The Binding Transformation operates with respect to an individual analog physical signature device and a computer program such that the computer program resulting from an application of the Binding Transformation performs correctly if and only if it is operated in association with said individual analog physical signature device.

Symbolically, if E is the program expression that is being replaced and G describes the functioning of the individual analog physical signature device to which the computer program is being bound, the Binding Transformation replaces E by $T_G$ such that $$E(x) = T_G(G(x)) = T_G(PhySig_G(x))$$

In particular, $$T_G(y) = \begin{cases} y - G(a) + c & E(x) = c, \text{ a program constant} \\ G^{-1}(y) & E(x) = x, \text{ a program variable} \\ f(G^{-1}(y)) & E(x) = f(x), \text{ a program function} \end{cases}$$

Figure 10:
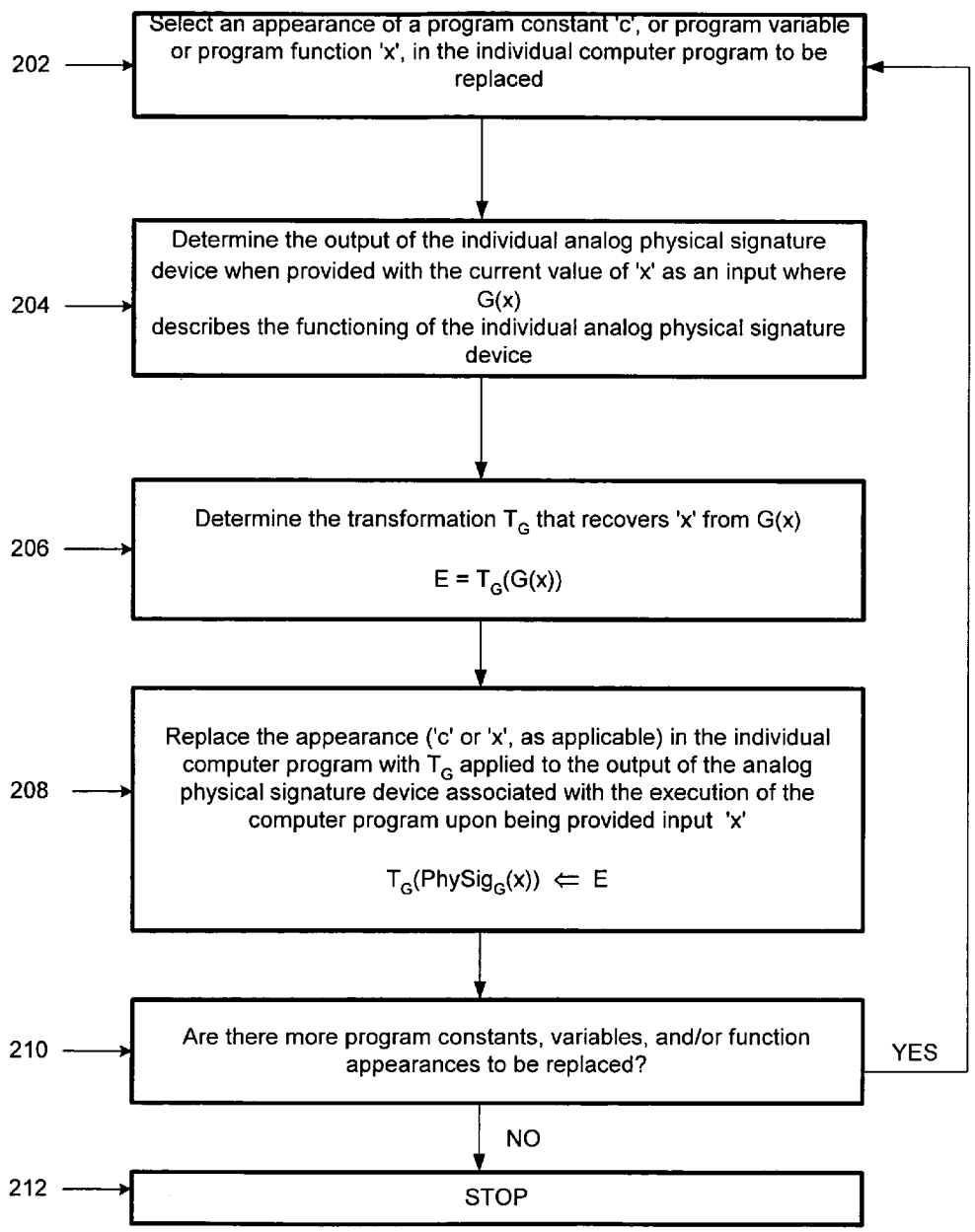
FIG. 10 illustrates one preferred exemplary method for replacing a program expression in a computer program using a Binding Transformation according to the present invention.

Table 3 shows E, $T_G$ and G for the examples above. FIG. 10 illustrates one preferred exemplary method 200 according to the present invention for replacing one or more program expressions E, e.g., one or more program constants, one or more program variables, and/or one or more program functions, by $T_G$ using such a Binding Transformation.

TABLE 3

Summary of Binding Transformation Examples

| Ex. | Type of Binding | E | $T_G$ | G |
|---|---|---|---|---|
| 1 | Tabular Response to a Program Constant | 3 | $y - 16$ | 19 |
| 2 | Tabular Response to a Program Function | $5x^2 + 3x$ | $\frac{10}{2-y} + 3\sqrt{\frac{2}{2-y}}$ | $2 - \frac{2}{x^2}$ |
| 3 | Waveform Response to a Program Constant | 3 | $\frac{y}{2.33}$ | 7 |
| 4 | Waveform Response to a Program Variable | x | $\frac{y}{(1-e^{-2})}$ | $(1-e^{-2})x$ |
| 5 | Waveform Response to a Program Function | $x^2$ | $\frac{-x}{y} - 1$ | $\frac{-x}{x^2+1}$ |

The expression $T_G(PhySig_G(x))$ that the Binding Transformation substitutes for the program expression E in the computer program is a function of both the original expression in the computer program, E, and the behavior of individual analog physical signature device G with the property is it difficult to determine either E or G individually by analysis of $T_G(PhySig_G(x))$. As a result, the computer program is bound to the analog physical signature device in such a way that neither the replaced program expression of the computer program nor the functioning of the analog physical signature device is revealed.

The examples above applied the Binding Transformation to a pseudo code representation of a computer program to illustrate the principles of the Binding Transformation. The Binding Transformation that is the subject of this patent application can be applied in the same manner to any programming language source code text form such as Cobol, Fortran, Pascal, C, Basic, Java or assembly language.

The Binding Transformation can also be applied in the same manner to binary forms of computer programs that result from processing the programming language source code text form and preparing it for use on a particular processor. The binary form to which the Binding Transformation is applied can be, for example, a static library object form, a dynamic link library form or an executable form.

The Binding Transformation that is the method and interactive system of the current invention has the property that in addition to binding an individual computer program to an individual analog physical signature device, it also provides protection against reverse engineering of the individual computer program. An attacker that comes into possession of the individual computer program, for example, in any of the forms mentioned above, without also being in possession of the individual analog physical signature device to which the individual computer program is bound will find it difficult to reverse engineer the computer program to discover the original program expressions in the unprotected program that have been replaced by the Binding Transformation. The protection against reverse engineering of the computer program provided by the Binding Transformation is an additional benefit of the method and system of the current invention.

A variety of modifications and variations of the present invention are possible in light of the above teachings. It is therefore to be understood that, within the scope of the appended claims, the present invention may be practiced otherwise than as specifically described herein.

What is claimed is:

1. A method for binding a computer program to an analog physical signature device to define an interactive system that controls the use of the computer program for its intended purpose, the method comprising the steps of:
    (a) providing instructions comprising the computer program, the instructions implementing an intended functionality;
    (b) providing the analog physical signature device to which the computer program is to be bound, the analog physical signature device being operative, in response to an analog input, to transform the analog input into a consequent, dependent analog output; and
    (c) replacing a code segment of the computer program instructions representing a program expression with an alternative code segment, the alternative code segment defining a predetermined digital input that is causally related to a predetermined analog input by means of the interactive system;
    (d) the alternative code segment being operative, when encountered during execution of the instructions comprising the computer program, to cause the predetermined analog input to be communicated to the physical object by means of the interactive system;
    (e) the analog physical signature device being operative to transform the predetermined analog input to a consequent, dependent analog output that is causally related to a predefined digital output by means of the interactive system;
    (f) the alternative code segment being operative to perform program functionality dependent upon the predetermined digital input and the predefined digital output.

2. The method of claim 1 wherein the computer program implements the intended functionality after replacement of the code segment with the alternative code segment if and only if the computer program is bound to the analog physical signature device such that the alternative code segment is operative, using the predefined digital output causally related to operation of the bound analog physical signature device, to realize the functionality of the replaced code segment.

3. The method of claim 1 wherein the computer program does not implement the intended functionality after replacement of the code segment with the alternative code segment if the computer program is bound to any other analog physical signature device since the alternative code segment is operative, using any other predefined digital output causally related to operation of any such other bound analog physical signature device, to realize functionality other than the functionality of the replaced code segment.

4. The method of claim 1 wherein the predefined consequent, dependent analog output of the analog physical signature device to which the computer program is bound is unique among all similar analog physical signature devices for the predetermined analog input.

5. The method of claim 1 wherein the interactive system includes a digital-to-analog conversion means that is operative to provide the causal relationship between the predetermined digital input and the predetermined analog input.

6. The method of claim 1 wherein the interactive system includes an analog-to-digital conversion means that is operative to provide the causal relationship between the consequent, dependent analog output and the consequent, dependent digital output.

7. The method of claim 1 wherein the replaced program expression is a program constant.

8. The method of claim 7 wherein the replaced program constant is a computational constant.

9. The method of claim 7 wherein the replaced program constant is a logical constant.

10. The method of claim 7 wherein the replaced program constant is a representational constant.

11. The method of claim 7 wherein the replaced program constant is a message constant.

12. The method of claim 1 wherein the replaced program expression is a program variable.

13. The method of claim 12 wherein the replaced program variable is an input variable.

14. The method of claim 12 wherein the replaced program variable is an intermediate result variable.

15. The method of claim 12 wherein the replaced program variable is a pointer variable.

16. The method of claim 12 wherein the replaced program variable is an output variable.

17. The method of claim 1 wherein the replaced program expression is a program function.

18. The method of claim 17 wherein the replaced program function is an offset function.

19. The method of claim 17 wherein the replaced program function is a size function.

20. The method of claim 17 wherein the replaced program function is a format function.

21. The method of claim 17 wherein the replaced program function is a mathematical or scientific function.

22. The method of claim 1 wherein the bound analog physical signature device comprises a relatively complex, immutable, inhomogeneous material that is operative to transform radiant waves such that the predetermined analog input is a predetermined radiant wave and the consequent, dependent analog output is a consequent, dependent radiant wave.

23. The method of claim 22 wherein the relatively complex, immutable, inhomogeneous material is operative to transform waves in the acoustic spectrum such that the predetermined analog input is a predetermined wave input in the acoustic spectrum and the consequent, dependent analog output is a consequent, dependent wave output in the acoustic spectrum.

24. The method of claim 23 wherein the relatively complex, immutable, inhomogeneous material is a solid block.

25. The method of claim 23 wherein the relatively complex, immutable, inhomogeneous material is a closed hollow container filled with a viscous fluid.

26. The method of claim 23 wherein the relatively complex, immutable, inhomogeneous material is a disc of porous sintered metal.

27. The method of claim 23 wherein the relatively complex, immutable, inhomogeneous material is a closed hollow container filled with ringing metal objects.

28. The method of claim 23 wherein the relatively complex, immutable, inhomogeneous material comprises a membrane stretched over a rigid structure.

29. The method of claim 22 wherein the relatively complex, immutable, inhomogeneous material is operative to transform waves in the electromagnetic spectrum such that the predetermined analog input is a predetermined wave input in the electromagnetic spectrum and the consequent, dependent analog output is a consequent, dependent wave output in the electromagnetic spectrum.

30. The method of claim 29 wherein the relatively complex, immutable, inhomogeneous material that is operative to transform light waves such that the predetermined analog input is a predetermined light wave input and the consequent, dependent analog output is a consequent, dependent light wave output.

31. The method of claim 30 wherein the relatively complex, immutable, inhomogeneous material is a solid translucent rod having small reflective flakes embedded therein.

32. The method of claim 30 wherein the relatively complex, immutable, inhomogeneous material is a solid translucent rod having small translucent colored spheres embedded therein.

33. The method of claim 30 wherein the relatively complex, immutable, inhomogeneous material is a glass mirror having impurities embedded therein.

34. The method of claim 30 wherein the relatively complex, immutable, inhomogeneous material is a glass mirror having surface irregularities.

35. The method of claim 30 wherein the relatively complex, immutable, inhomogeneous material is a glass mirror having an inhomogeneous metallic backing.

36. The method of claim 1 wherein the replacing step comprises:
  replacing a plurality of code segments of the computer program instructions representing a corresponding plurality of program expressions with alternative code segments, each alternative code segment defining a predetermined digital input that is causally related to a predetermined analog input by the interactive system such that each of the alternative code segments is operative to perform program functionality dependent upon the predetermined digital input and the predefined digital output associated with each such alternative code segment.

37. An interactive system for binding a computer program, the computer program including instructions for implementing an intended functionality, the interactive system comprising:
  an analog physical signature device that is operative to transform an analog input into a consequent, dependent analog output;
  an alternative code segment that replaces a code segment of the computer program instructions representing a program expression to bind the computer program to the analog physical signature device, the alternative code segment defining a predetermined digital input;
  a digital-to-analog conversion means in communication with the computer program and the analog physical signature device and operative to causally relate the predetermined digital input to a predetermined analog input that is communicated to the analog physical signature device wherein the predetermined analog input is transformed into a consequent, dependent analog output; and
  an analog-to-digital conversion means in communication with the computer program and the analog physical signature device and operative to causally relate the consequent, dependent analog output to a predefined digital output;
  the alternative code segment including instructions for communicating the predetermined digital input to the digital-to-analog conversion means, for retrieving the predefined digital output from the analog-to-digital conversion means, and for functionally processing the predefined digital output;
  wherein, when the alternative code segment is encountered during execution of the computer program instructions, the alternative code segment is operative to communicate the predetermined digital input to the digital-to-analog conversion means and to perform program functionality dependent upon the predetermined digital input and the predefined digital output retrieved from the analog-to-digital conversion means.

38. The interactive system of claim 1 wherein the analog physical signature device comprises:
  a relatively complex, immutable, inhomogeneous material that is operative to transform the predetermined analog input into the consequent, dependent analog output;
  means in communication with the digital-to-analog conversion means and operative to interact the analog input with the relatively complex, immutable, inhomogeneous material; and
  means for detecting the consequent, dependent analog output from the relatively complex, immutable, inhomogeneous material.

39. The interactive system of claim 38 wherein the relatively complex, immutable, inhomogeneous material is operative to transform radiant waves such that the predetermined analog input is a predetermined radiant wave input and the consequent, dependent analog output is a consequent, dependent radiant wave output.

40. The interactive system of claim 39 wherein the radiant waves are in the electromagnetic spectrum such that the predetermined radiant wave input is a predetermined wave input in the electromagnetic spectrum and the consequent, dependent wave output is a consequence, dependent wave output in the electromagnetic spectrum.

41. The interactive system of claim 40 wherein the radiant waves in the electromagnetic spectrum are light waves such that the predetermined wave input in the electromagnetic spectrum is a predetermined light wave input and the consequent, dependent wave output in the electromagnetic spectrum is a consequent, dependent light wave output.

42. The interactive system of claim 41 wherein the relatively complex, immutable, inhomogeneous material is a solid translucent rod having small reflective flakes embedded therein that is operative to transform the predetermined light wave input into the consequent dependent light wave output.

43. The interactive system of claim 41 wherein the relatively complex, immutable, inhomogeneous material is a solid translucent rod having small translucent colored spheres embedded therein that is operative to transform the predetermined light wave input into the consequent dependent light wave output.

44. The interactive system of claim 41 wherein the relatively complex, immutable, inhomogeneous material is a glass mirror having impurities embedded therein that is operative to transform the predetermined light wave input into the consequent dependent light wave output.

45. The interactive system of claim 41 wherein the relatively complex, immutable, inhomogeneous material is a glass mirror having surface irregularities that is operative to transform the predetermined light wave input into the consequent dependent light wave output.

46. The interactive system of claim 41 wherein the relatively complex, immutable, inhomogeneous material is a glass mirror having an inhomogeneous metallic backing that is operative to transform the predetermined light wave input into the consequent dependent wave output that is operative to transform the predetermined light wave input into the consequent dependent light wave output.

47. The interactive system of claim 39 wherein the radiant waves are in the acoustic spectrum such that the predetermined radiant wave input is a predetermined acoustic wave input and the consequent, dependent wave output is a consequent, dependent acoustic wave output.

48. The interactive system of claim 47 wherein the relatively complex, immutable, inhomogeneous material is a solid block that is operative to transform the predetermined acoustic wave input to the consequent, dependent acoustic wave output.

49. The interactive system of claim 47 wherein the relatively complex, immutable, inhomogeneous material is a closed hollow container filled with a viscous fluid that is operative to transform the predetermined acoustic wave input to the consequent, dependent acoustic wave output.

50. The interactive system of claim 47 wherein the relatively complex, immutable, inhomogeneous material is a disc of porous sintered metal that is operative to transform the predetermined acoustic wave input to the consequent, dependent acoustic wave output.

51. The interactive system of claim 47 wherein the relatively complex, immutable, inhomogeneous material is a closed hollow container filled with ringing metal objects that is operative to transform the predetermined acoustic wave input to the consequent, dependent acoustic wave output.

52. The interactive system of claim 47 wherein the relatively complex, immutable, inhomogeneous material comprises a membrane stretched over a rigid structure that is operative to transform the predetermined acoustic wave input to the consequent, dependent acoustic wave output.

53. The interactive system of claim 37 wherein the replaced program expression is a program constant.

54. The interactive system of claim 53 wherein the replaced program constant is a computational constant.

55. The interactive system of claim 53 wherein the replaced program constant is a logical constant.

56. The interactive system of claim 53 wherein the replaced program constant is a representational constant.

57. The interactive system of claim 53 wherein the replaced program constant is a message constant.

58. The interactive system of claim 37 wherein the replaced program expression is a program variable.

59. The interactive system of claim 58 wherein the replaced program variable is an input variable.

60. The interactive system of claim 58 wherein the replaced program variable is an intermediate result variable.

61. The interactive system of claim 58 wherein the replaced program variable is a pointer variable.

62. The interactive system of claim 58 wherein the replaced program variable is an output variable.

63. The interactive system of claim 37 wherein the replaced program expression is a program function.

64. The interactive system of claim 63 wherein the replaced program function is an offset function.

65. The interactive system of claim 63 wherein the replaced program function is a size function.

66. The interactive system of claim 63 wherein the replaced program function is a format function.

67. The interactive system of claim 63 wherein the replaced program function is a mathematical or scientific function.

68. The interactive system of claim 37 wherein the computer program implements the intended functionality after replacement of the code segment with the alternative code segment if and only if the computer program is bound to the analog physical signature device, such that the alternative code segment is operative, using the predefined digital output causally related to operation of the analog physical signature device, to realize the functionality of the replaced code segment.

69. The interactive system of claim 37 wherein the computer program does not implement the intended functionality after replacement of the one code segment with the alternative code segment if the computer program is bound to any other analog physical signature device since the alternative code segment is operative, using any other predefined digital output causally related to operation of any other bound analog physical signature device, to realize functionality other than the functionality of the replaced code segment.

70. The interactive system of claim 37 wherein the replaced program expression and the operation of the analog physical signature device in combination provide protection against reverse engineering of the bound computer program.

71. The method of claim 1 wherein the replaced program expression and the operation of the analog physical signature device in combination provide protection against reverse engineering of the bound computer program.

* * * * *